Jan. 11, 1966 A. QUENOT 3,228,626

TAPE MEASURE

Filed July 6, 1964

United States Patent Office 3,228,626
Patented Jan. 11, 1966

3,228,626
TAPE MEASURE
André Quenot, Besancon (Doubs), France, assignor to Firm of Etablissements Quenot & Cie, Besancon (Doubs), France
Filed July 6, 1964, Ser. No. 380,458
Claims priority, application France, Mar. 24, 1964, 968,561
5 Claims. (Cl. 242—84.8)

In winding a metal tape in length-measuring instruments, friction arising between the movable parts is considered important by reason of the binding character of the mechanism. The present invention removes such drawback by providing an instrument including an open cylindrical casing, a drum in the casing, a cover holding the drum and provided with an eccentric opening for the passage of the tape.

According to a feature of the invention, the cover is made of plastic material and is formed in one with a cylindrical wall extending between the peripheral walls of the casing and of the drum so as to limit the friction between the drum and the casing and the cover on the one hand and between the tape slidingly engaging the eccentric opening in the cover and said cover on the other hand.

Figure 1:
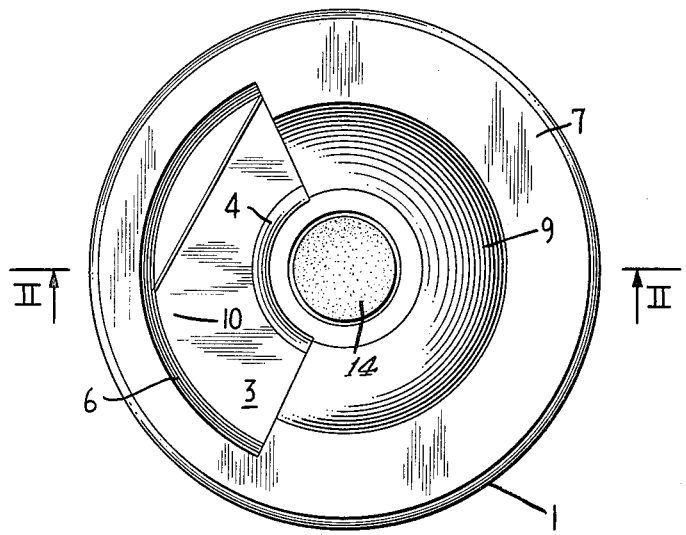
Figure 2:
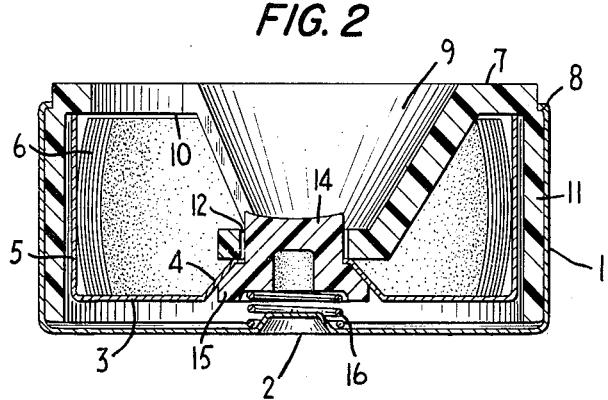

The accompanying drawings illustrate by way of example a preferred embodiment of such an improvement instrument. In said drawings:

FIG. 1 is a plan view of the tape measure,
FIG. 2 is a sectional view through line II—II of FIG. 1.

The arrangement illustrated includes a cylindrical casing 1 open at its upper end and provided with a central boss 2 raised through inward stamping over the bottom of the casing. Inside the casing 1 is housed a drum 3 the bottom of which is provided with an inwardly projecting frusto-conical centrally apertured boss 4 coaxial with the casing boss 2, while a metal tape 6 of a concave cross-section is wound within the inner peripheral surface of the drum. The drum is held inside the casing by means of a cover 7 along the outer peripheral step 8 of which the upper edge of the cylindrical wall of the casing 1 is folded inwardly.

The cover 7 includes a central depressed section 9, an upper flat transverse section interconnecting the upper edge of the peripheral section and the outer upper edge of the converging section and provided with an eccentric opening, and is provided with an eccentric opening 10 connecting the inside of the drum 3 with the outside; said cover is rigid with a peripheral wall 11 extending downwardly between the outer cylindrical side walls of the casing and of the drum. The central depressed section of the cover is provided with a further central opening 12 registering with the aperture formed in the boss 4 of the drum bottom.

A mechanism for braking the drum 5 along its upper peripheral edge and urging the latter against the lower surface of the cover and also the upper edge of its frusto-conical boss 4 against the lower end of the depressed section of the cover, is controlled by a push-button 14 engaging the central opening 12 in the cover and the cooperating opening in the drum boss 4. Said push-button includes an annular collar 15 urging the upwardly directed boss 4 of the drum against the depressed section of the cover under the action of a spring 16 bearing against the bottom of the casing round the central boss 2 thereof.

When assembling the instrument, the spring 16 is first inserted inside the casing with the push-button after which the drum is fitted coaxially with the casing round the push-button and lastly the whole arrangement is capped by means of its cover, the lateral peripheral wall of which is set between the casing and the drum. The upper edge of the peripheral wall of the casing is then folded back over the corresponding outer step 8 of the cover, so that the different parts of the arrangement are permanently assembled.

The operation of the arrangement described is extremely simple. It is sufficient, as a matter of fact, to draw the end of the tape through the opening in the cover and then to depress the push-button which releases the braking of the drum so that the tape which is urged into an unwound condition by its concave cross-section is projected outwardly as provided by the free pivotal movement of the drum. Conversely, when it is desired to brake the projection of the tape out of the casing or to lock the tape in a predetermined projecting position, it is sufficient to reduce the pressure exerted on the push-button or to release it completely.

The instrument according to the invention is advantageous since its operation is extremely smooth. As a matter of fact, in the preferred embodiment, the casing, the drum and the tape are all made of metal whereas the cover and the push-button are made of a plastic self-lubricating material. The friction, on the one hand, of the drum against the cover and against the push-button and, on the other hand, of the tape against the surface of the eccentric opening formed in the cover is thus reduced to a minimum since the friction between metal and a plastic material is extremely low.

Obviously the arrangement, except for the tape, may be made entirely of plastic material, for instance of two different plastic materials showing cooperating properties, the spring remaining advantageously made of metal. In this latter case, the arrangement resists corrosion to a considerable extent so that, in particular, it may be immersed in sea water.

Lastly, the improved arrangement disclosed is quite novel both in its execution and in its aesthetic appearance. It is extremely economical and allows various combinations as provided by the possibility of selecting different materials and their colors. The easy handling of the arrangement makes its use pleasant for the operator.

What I claim is:

1. A tape measure comprising an open casing including a cylindrical peripheral wall and a bottom, a drum removably housed coaxially inside said casing and including a cylindrical peripheral wall and a bottom, a measuring tape made of metal wound inside said drum, a cover fitted over the drum to hold it in position with reference to the casing and provided with an eccentric opening forming an outlet for the tape out of the drum, and a push-button coaxial with the casing and controlling the friction between the rotary drum and the cover.

2. A tape measure comprising an open casing including a cylindrical peripheral wall and a bottom, a drum removably housed coaxially inside said casing and including a cylindrical peripheral wall and a bottom, a measuring tape made of metal wound inside said drum, a cover fitted over the drum to hold it in position with reference to the casing and provided with an eccentric opening forming an outlet for the tape out of the drum, said cover including a cylindrical wall fitted between the cylindrical walls of the casing and of the drum and made of plastic material, and a push-button coaxial with the casing and controlling the engagement of the rotary drum with the cover.

3. A tape measure comprising an open casing made of metal, including a cylindrical peripheral wall and a bottom, a drum made of metal, removably housed coaxially inside said casing and including a cylindrical peripheral wall and a bottom, a measuring tape made of metal wound inside said drum, a cover fitted over the drum to hold it in position with reference to the casing and provided with an eccentric opening forming an outlet for the tape out of the drum, said cover including a cylindrical wall fitted between the cylindrical walls of the casing and of the drum and made of plastic material, and a push-button coaxial with the casing and controlling the engagement between the rotary drum and the cover, said cover and push-button being made of self-lubricating plastic material.

4. A tape measure comprising a cylindrical casing including a bottom and a cylindrical peripheral wall, a drum freely and coaxially carried inside said casing and including a centrally apertured bottom and a cylindrical peripheral wall, a cover made of plastic material including a depending peripheral section fitted between the peripheral cylindrical walls of the drum and of the casing, a central frusto-conical downwardly converging section provided with an axial opening and an upper flat transverse section interconnecting the upper edge of the peripheral section and the outer upper edge of the converging section and provided with an eccentric opening, a tape wound inside the peripheral wall of the drum and the end of which is adapted to be drawn out through the eccentric opening in the transverse section of the cover, a push-button extending through the first-mentioned axial opening in the cover and the aperture in the bottom of the drum and engaging the underside of said drum bottom, and a spring urging normally said push-button upwardly to urge said drum into braking engagement with the cover, manual depression of the push-button in antagonism with the spring releasing said braking engagement.

5. A tape measure comprising an open casing including a cylindrical peripheral wall and a bottom, a drum removably housed coaxially inside said casing and including a cylindrical peripheral wall and a bottom, a measuring tape made of metal wound inside said drum, a cover fitted over the drum to hold it in position with reference to the casing and provided with an eccentric opening forming an outlet for the tape out of the drum, a spring carried centrally of the casing bottom and urging the drum upwardly to make the peripheral wall of the latter engage the lower surface of the cover, and a push-button fitted slidingly in the center of the cover and adapted when depressed to compress the spring and thereby release the engagement between the drum and the cover.

References Cited by the Examiner
UNITED STATES PATENTS 1,799,044    3/1931    Farrand _____ 242—84.8

MERVIN STEIN, *Primary Examiner.*

N. L. MINTZ, *Assistant Examiner.*